United States Patent
Chen et al.

(10) Patent No.: US 12,117,335 B2
(45) Date of Patent: Oct. 15, 2024

(54) SOUND ISOLATION TESTING SYSTEM AND SOUND ISOLATION TESTING METHOD

(71) Applicant: PEGATRON CORPORATION, Taipei (TW)

(72) Inventors: Sz-Ting Chen, Taipei (TW); Fang-Kuei Han, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/869,855

(22) Filed: Jul. 21, 2022

(65) Prior Publication Data

US 2023/0062688 A1    Mar. 2, 2023

(30) Foreign Application Priority Data

Aug. 30, 2021   (TW) .................................. 110131963

(51) Int. Cl.
*G01H 15/00* (2006.01)
*H04R 29/00* (2006.01)

(52) U.S. Cl.
CPC ........... *G01H 15/00* (2013.01); *H04R 29/004* (2013.01)

(58) Field of Classification Search
CPC .............................. G01H 15/00; H04R 29/004
See application file for complete search history.

(56) References Cited

U.S. PATENT DOCUMENTS

| | | | |
|---|---|---|---|
| 9,326,080 B2 | 4/2016 | Doller et al. | |
| 2009/0164148 A1* | 6/2009 | Shinoda | G01M 3/26 702/45 |
| 2011/0261986 A1* | 10/2011 | Murayama | H04R 1/02 220/9.1 |
| 2014/0360251 A1* | 12/2014 | Lee | G01M 3/3209 73/49.3 |
| 2019/0268079 A1 | 8/2019 | Henry et al. | |
| 2019/0346336 A1* | 11/2019 | Regef | G01M 3/04 |
| 2020/0204895 A1 | 6/2020 | Wendling et al. | |

FOREIGN PATENT DOCUMENTS

| | | | | |
|---|---|---|---|---|
| CN | 111465426 A | | 7/2020 | |
| CN | 112729696 A | * | 4/2021 | ............. G01M 3/02 |
| CN | 112816151 A | | 5/2021 | |
| TW | 201414321 A | | 4/2014 | |
| TW | 201701605 A | | 1/2017 | |
| TW | M599387 U | | 8/2020 | |

OTHER PUBLICATIONS

Machine Translation of CN112729696A Abstract, Description, and Claims from the Original Language to English, Aug. 26, 2023, EPO, https://worldwide.espacenet.com/patent/search/family/075610773/publication/CN112729696A?q=pn%3DCN112729696A, pp. 1-14 (Year: 2023).*

* cited by examiner

*Primary Examiner* — Daniel R Sellers
(74) *Attorney, Agent, or Firm* — Li & Cai Intellectual Property (USA) Office

(57) ABSTRACT

A sound isolation testing system and a sound isolation testing method are provided. The sound isolation testing system is adapted to test a product having a sound hole, and includes a detection device and a gas pressure detector. The detection device includes a gas cover, and the sound hole is sealed by the gas cover. The gas pressure detector is electrically connected to the detection device. The gas pressure detector determines a gas pressure change rate in the sound hole, and calculates the sound isolation value of the product according to the gas pressure change rate.

9 Claims, 8 Drawing Sheets

SOUND ISOLATION TESTING SYSTEM AND SOUND ISOLATION TESTING METHOD

CROSS-REFERENCE TO RELATED PATENT APPLICATION

This application claims the benefit of priority to Taiwan Patent Application No. 110131963, filed on Aug. 30, 2021. The entire content of the above identified application is incorporated herein by reference.

FIELD OF THE DISCLOSURE

The present disclosure relates to a sound isolation testing system with respect to a product and a method thereof, and more particularly to a sound isolation testing system based on a gas pressure change rate and a method thereof.

BACKGROUND OF THE DISCLOSURE

In the related art, a sound isolation of a microphone affects accuracy of an echo suppression algorithm or a direction recognition algorithm of the microphone. In order to reduce misjudgment of an audio algorithm of the microphone, when designing a structure of the microphone, a certain sound isolation of the microphone must be satisfied to prevent the misjudgment of the audio algorithm resulted from the sound entering the microphone through unexpected paths. FIG. 1 is a schematic view showing the structure of an existing microphone. The microphone A includes a casing A11, an audio processing circuit A12, a printed circuit board A13, two sound isolation boards A14 and a sound hole A15. The sound hole A15 penetrates through the casing A11, and the two sound isolation boards A14 are connected between the casing A11 and the printed circuit board A13. The audio processing circuit A12 is electrically connected to the printed circuit board A13. Ideally, if the microphone A is well assembled and has no gaps, sound enters the sound hole A15 of the microphone A only through a first path S. When the microphone A has a gap due to poor assembly, apart from entering the microphone A through the sound hole A15, the sound can also enter the microphone A through a second path S2 and a third path S3.

Currently, to perform a sound isolation test of the microphone, a sound signal having a predetermined loudness is emitted to the microphone. After the microphone receives the sound signal, the sound signal is converted into a first voltage signal. The clay is used to block a sound hole of the microphone, and the sound source then emits another sound signal having the same loudness toward the microphone. Since the sound hole of the microphone has been blocked by the clay, energy of another sound signal received by the microphone becomes smaller. Therefore, a voltage value of a second voltage signal converted from another sound signal received by the microphone is smaller than a voltage value of the first voltage signal. The larger a difference between the second voltage signal and the first voltage signal is (meaning that the sound can essentially only enter the microphone through the sound hole), the better the sound isolation performance of the microphone is.

However, to perform the above-mentioned sound isolation test, certain requirements need to be imposed on background noise. Moreover, a number of devices need to be set up in advance to control the microphone for recording and file conversion. The process of setting up the devices and completing the sound isolation test usually takes around one hour, which is very inefficient for a tester and inconvenient for production line testing.

SUMMARY OF THE DISCLOSURE

In response to the above-referenced technical inadequacies, the present disclosure provides a sound isolation testing system and a sound isolation testing method.

In one aspect, the present disclosure provides a sound isolation testing system. The sound isolation testing system is adapted to test a product having a sound hole, and includes a detection device and a gas pressure detector. The detection device includes a gas cover, wherein the sound hole is sealed by the gas cover. The gas pressure detector is electrically connected to the detection device. The gas pressure detector determines a gas pressure change rate in the sound hole and calculates a sound isolation value of the product according to the gas pressure change rate.

In another aspect, the present disclosure provides a sound isolation testing method. The sound isolation testing method is adapted to test a product having a sound hole. The sound isolation testing method includes: inflating or deflating the sound hole; stopping inflation or deflation of the sound hole when a gas pressure of the sound hole reaches a target pressure; recording a change of the gas pressure in the sound hole to calculate a gas pressure change rate; and calculating a sound isolation value of the product according to the gas pressure change rate.

Therefore, in the sound isolation testing system and the sound isolation testing method provided by the present disclosure, a result of the test can be quickly obtained. Since background noise around the product can be ignored and the product does not need to perform any action, the time required for testing a sound isolation value of the product can be significantly reduced. At the same time, the sound isolation value of the product can be obtained without having to set up a large number of devices in advance and meeting strict requirements for the testing environment.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
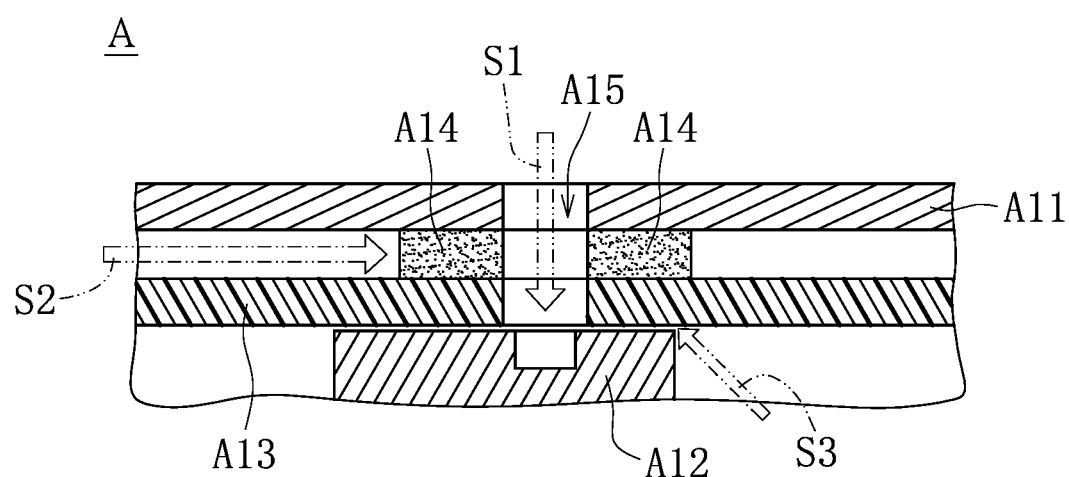
FIG. 1 is a schematic view showing a structure of a microphone.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In a sound isolation testing system and a sound isolation testing method provided by the present disclosure, a sound hole of the microphone is inflated or deflated until a gas pressure in the sound hole reaches a target pressure, so as to quickly obtain a sound isolation value of the microphone. If the microphone has no other gaps other than the sound hole, theoretically, the gas pressure in the sound hole can be continuously maintained at the target pressure. Conversely, if the microphone has other gaps in addition to the sound hole, gas in the sound hole will leak out through the gaps, so that the gas pressure in the sound hole is gradually decreased. A gas pressure detector can calculate the sound isolation value of the microphone according to a rate of change of a gas pressure in the sound hole of the microphone.

Figure 2:
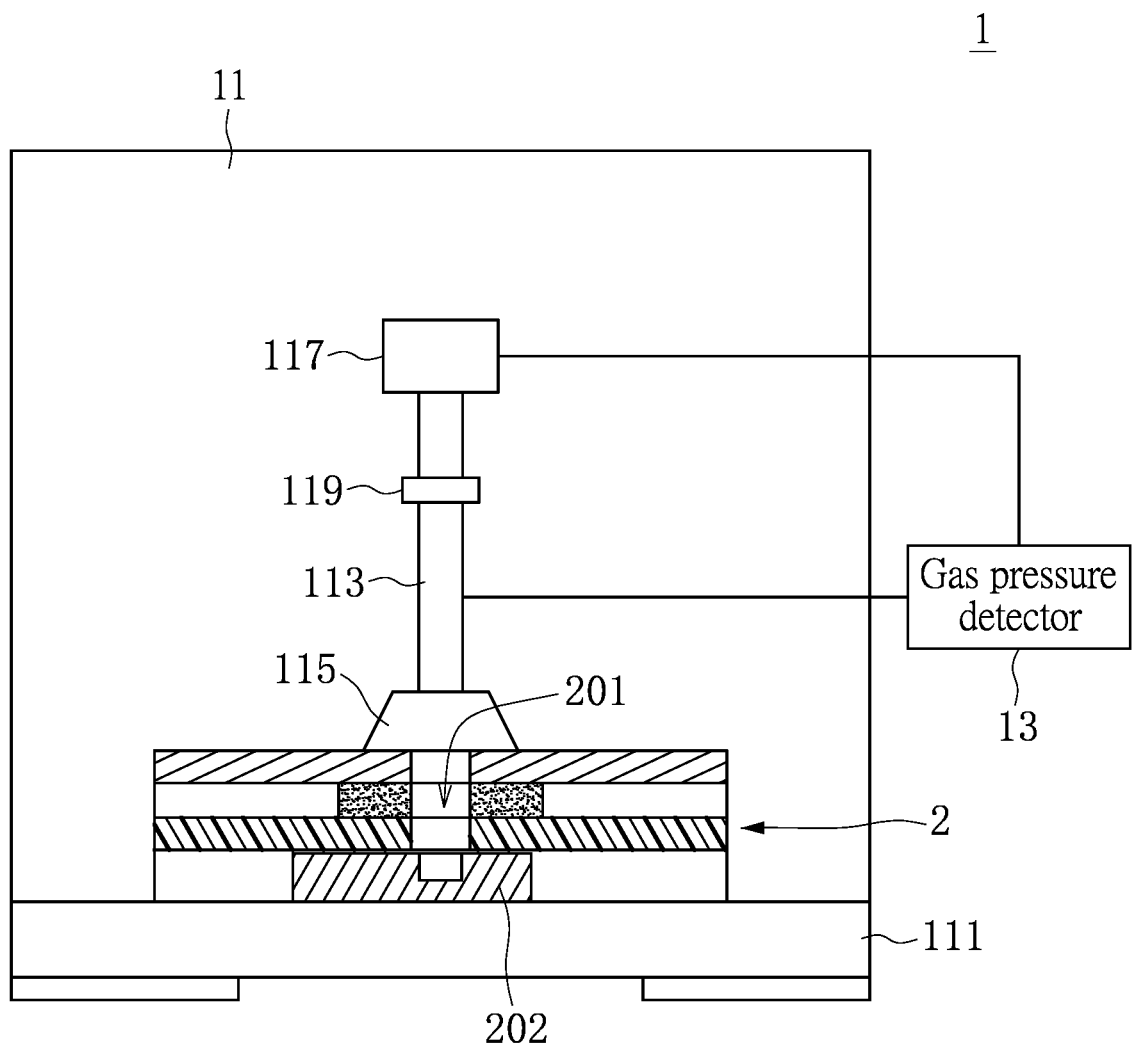
FIG. 2 is a schematic view showing a sound isolation testing system according to a first embodiment of the present disclosure.

FIG. 2 is a schematic view showing a sound isolation testing system according to a first embodiment of the present disclosure. As shown in FIG. 2, a sound isolation testing system 1 is adapted to test a sound isolation value of a microphone 2, and the microphone 2 is used as a product. The microphone 2 includes a sound hole 201 and an audio processing circuit 202. The sound isolation testing system 1 includes a detection device 11 and a gas pressure detector 13, and the gas pressure detector 13 is electrically connected to the detection device 11. The detection device 11 includes a base 111, a gas pipeline 113, a gas cover 115, a gas pressure generator 117 and a control valve 119.

The base 111 of the detection device 11 is used to support and fix the microphone 2. The gas pipeline 113 includes a first end and a second end opposite to the first end. The gas cover 115 is assembled with the first end of the gas pipeline 113. The sound hole 201 is sealed by the gas cover 115 so that a closed space is formed between the gas cover 115 and an inner wall of the sound hole 201. The second end of the gas pipeline 113 is connected to the gas pressure generator 117. The control valve 119 is assembled between the first end and the second end of the gas pipeline 113. The control valve 119 can be, for example, a gas pressure valve. The control valve 119 is normally in a closed state, and thus a gas pressure in the closed space is not affected by the gas pressure generator 117. When the gas pressure generator 117 introduces or expels gas, i.e. the sound hole 201 is inflated or deflated by the gas pressure generator 117, the control valve 119 is switched from the closed state to an opened state. When the control valve 119 is in the opened state, the gas pressure generator 117 introduces gas to or expels gas from the closed space through the gas pipeline 113. In other words, the sound hole 201 is inflated or deflated by the gas pressure generator 117 to change a gas pressure in the sound hole 201.

Figure 3:
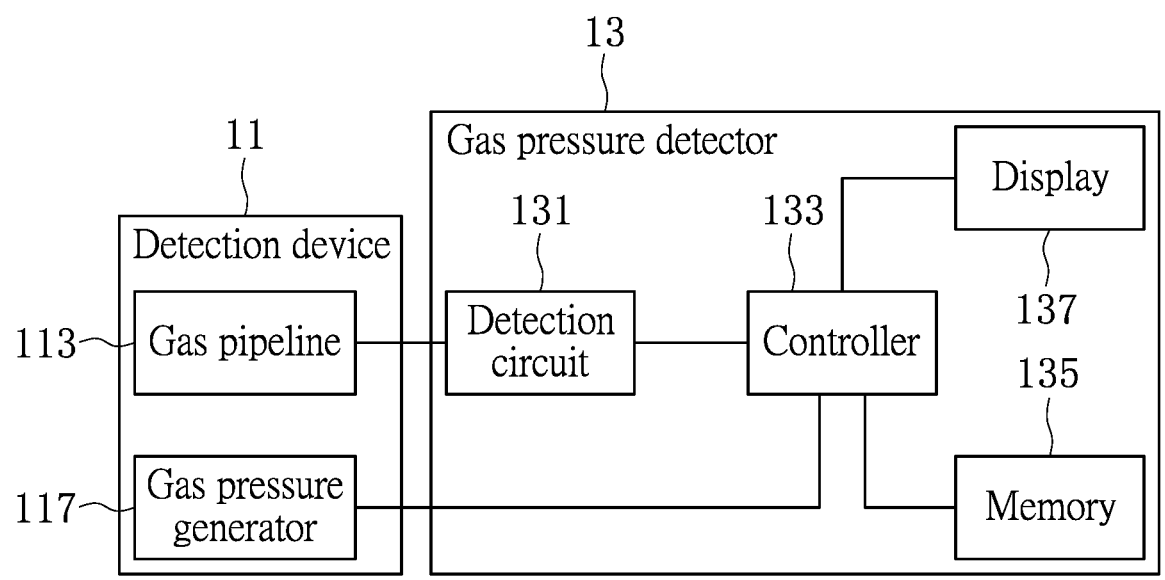
FIG. 3 is a functional block diagram of a gas pressure detector of FIG. 2.

FIG. 3 is a functional block diagram of a gas pressure detector of FIG. 2. Referring to FIGS. 2 and 3, the gas pressure detector 13 includes a detection circuit 131, a controller 133, a memory 135 and a display 137. The detection circuit 131 is connected to the gas pipeline 113 of the detection device 11, so as to detect the gas pressure in the sound hole 201. The controller 133 is electrically connected to the detection circuit 131 and the gas pressure generator 117 of the detection device 11. The controller 133 sets a target pressure and a pressure tolerance time. The memory 135 and the display 137 are each electrically connected to the controller 133. The controller 133 receives the gas pressure detected by the detection circuit 131 in the sound hole 201, and instructs the gas pressure generator 117 of the detection device 11 to inflate or deflate the sound hole 201 or to stop inflating or deflating the sound hole 201 according to said gas pressure. The gas pressure detected by the detection circuit 131 in the sound hole 201 is stored by the memory 135. A graph showing a relationship between the gas pressure in the sound hole 201 and time is displayed by the display 137.

Figure 4:
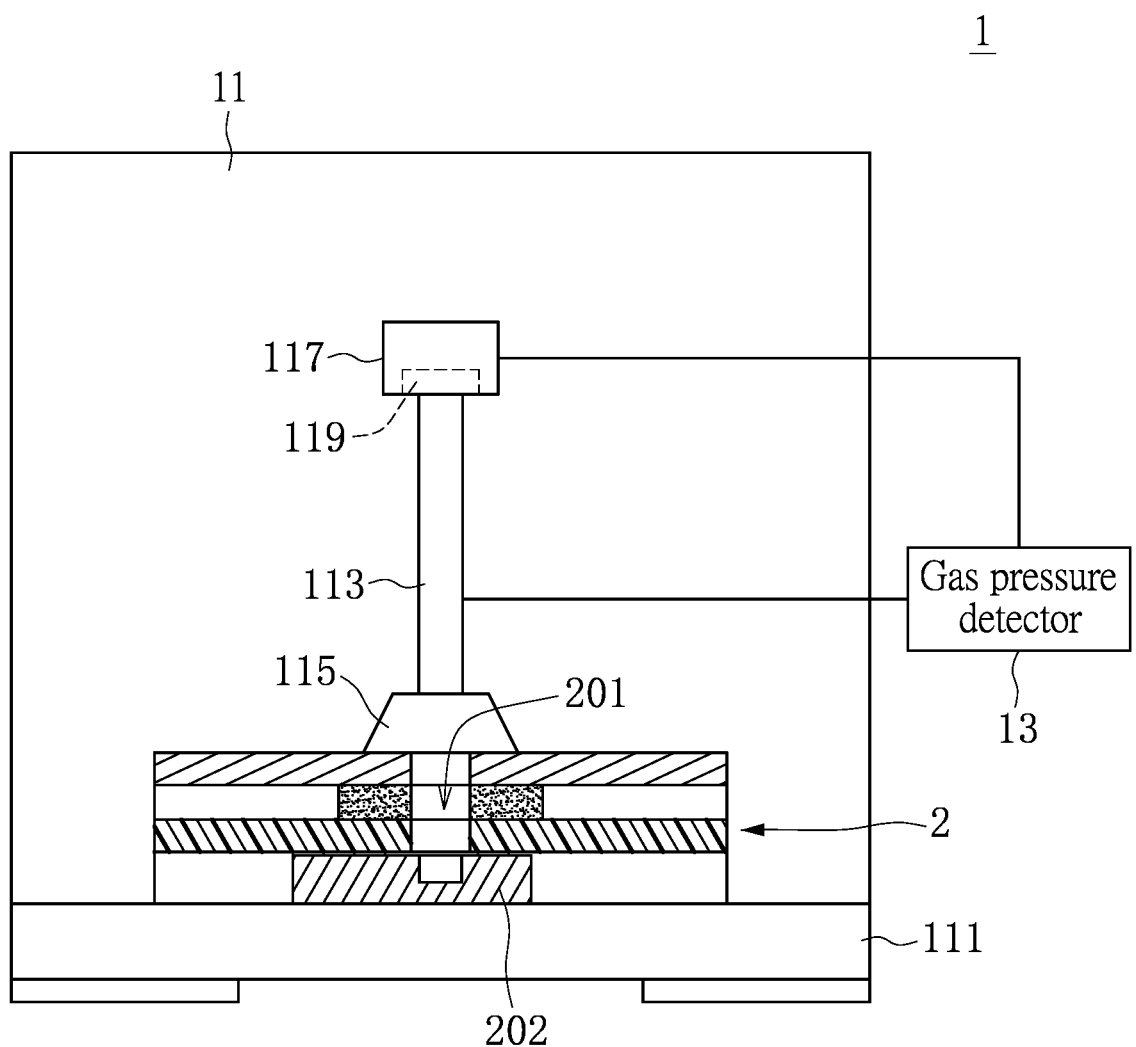
FIG. 4 is a schematic view showing the sound isolation testing system according to a second embodiment of the present disclosure.

FIG. 4 is a schematic view showing the sound isolation testing system according to a second embodiment of the present disclosure. The main difference between the sound isolation testing system of FIG. 4 and the sound isolation testing system of FIG. 2 is that the pressure generator 117 is integrated with the control valve 119 in the second embodiment.

Figure 5:
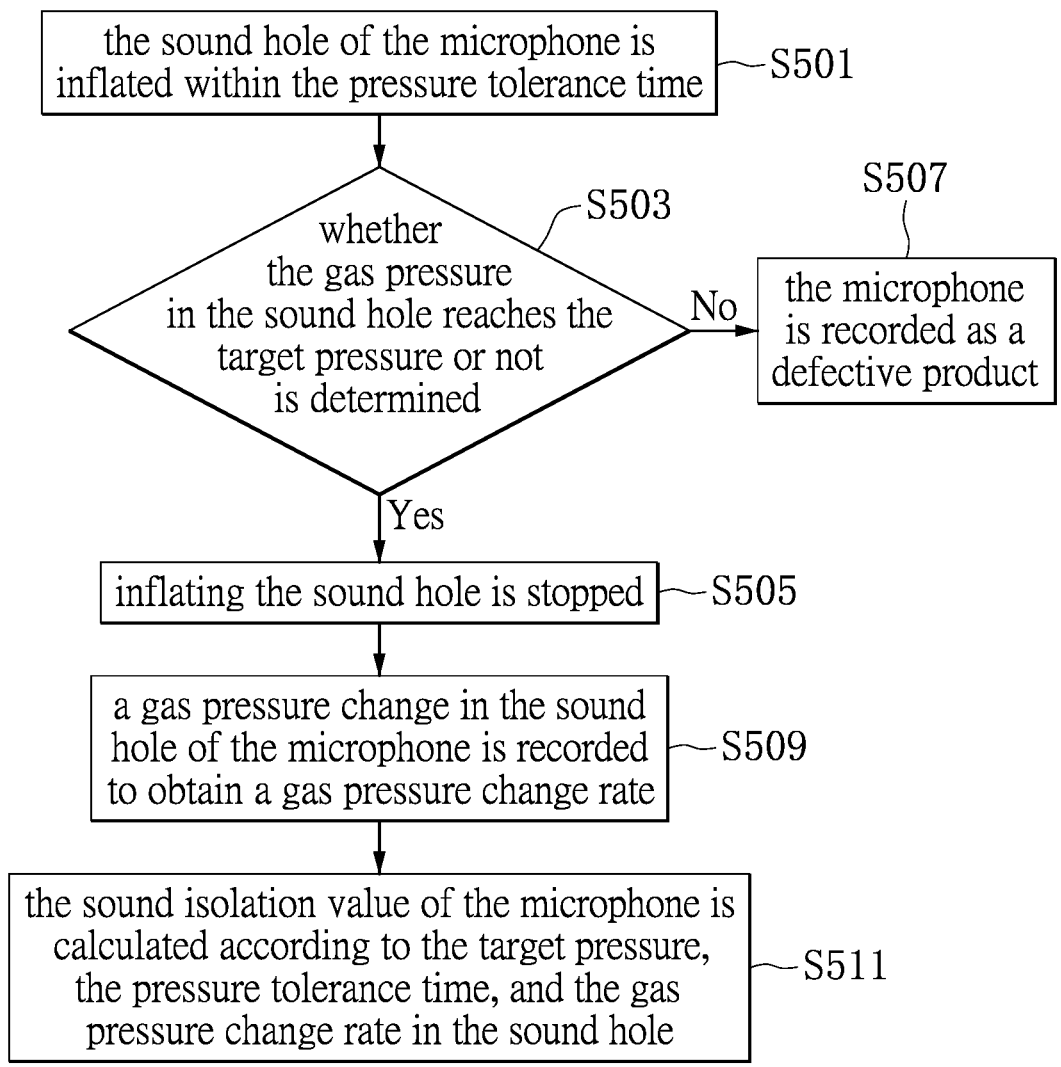
FIG. 5 is a flowchart of a sound isolation testing method according to the first embodiment of the present disclosure.

FIG. 5 is a flowchart of a sound isolation testing method according to the first embodiment of the present disclosure. Referring to FIG. 5, in step S501, the sound hole 201 of the microphone 2 is inflated within the pressure tolerance time. In other embodiments, the sound hole 201 of the microphone 2 can also be deflated within the pressure tolerance time. In step S503, whether the gas pressure in the sound hole 201 reaches the target pressure or not is determined. When the gas pressure in the sound hole 201 is confirmed to reach the target pressure (e.g. a positive pressure), the step S503 is followed by step S505. When the sound hole 201 of the microphone 2 is deflated, the target pressure is a negative pressure. In the step S505, inflating the sound hole 201 is stopped. When the gas pressure in the sound hole 201 has not reached the target pressure, the step S503 is followed by step S507. In the step S507, the microphone 2 is recorded as a defective product.

In step S509, after inflating the sound hole 201 of the microphone 2 is stopped, a gas pressure change in the sound hole 201 of the microphone 2 is recorded to obtain a gas pressure change rate. A definition of the gas pressure change rate is a change of the gas pressure divided by a unit time (e.g., 1 second) after inflating or deflating the sound hole 201 is stopped. In step S511, the sound isolation value of the microphone 2 is calculated according to the target pressure, the pressure tolerance time, and the gas pressure change rate in the sound hole 201. The sound isolation testing method is ended after the step S511. A measurement unit of the sound isolation value is decibel (dB). The larger the decibel of the sound isolation value is, the better the sound isolation performance is. For example, a formula of the sound isolation value is $F=a*x+b*y+c*z+d$, in which F is the sound isolation value of the microphone 2, x is the target pressure, y is the pressure tolerance time, z is the gas pressure change rate in the sound hole 201, and a, b, c and d are correction parameters. Under the same target pressure, the same microphone is tested for sound isolation multiple times, and theoretically, the sound isolation measured each time should be the same. In addition, z can be a non-fixed value (i.e., z is a curve function relative to time), or z can be a fixed value.

The sound isolation testing method of FIG. 5 can be performed by the sound isolation testing system of FIG. 2 or the sound isolation testing system of FIG. 4. Specifically, in the step S501, the controller 133 of the gas pressure detector 13 instructs the gas pressure generator 117 of the detection device 11 to inflate the sound hole 201 of the microphone 2. In the step S505, the controller 133 of the gas pressure detector 13 instructs the gas pressure generator 117 to stop inflating the sound hole 201 of the microphone 2. The steps S503, S509 and S511 are performed by the controller 133 of the gas pressure detector 13, and the step S507 is performed by the memory 135.

It should be noted that the sound isolation testing method of FIG. 5 can also be performed by other gas pressure testing devices, and is not limited to the sound isolation testing system of FIG. 2 or the sound isolation testing system of FIG. 4. For example, inflating the sound hole 201 and detecting the gas pressure in the sound hole 201 may both be performed by the gas pressure detector 13.

Figure 6:
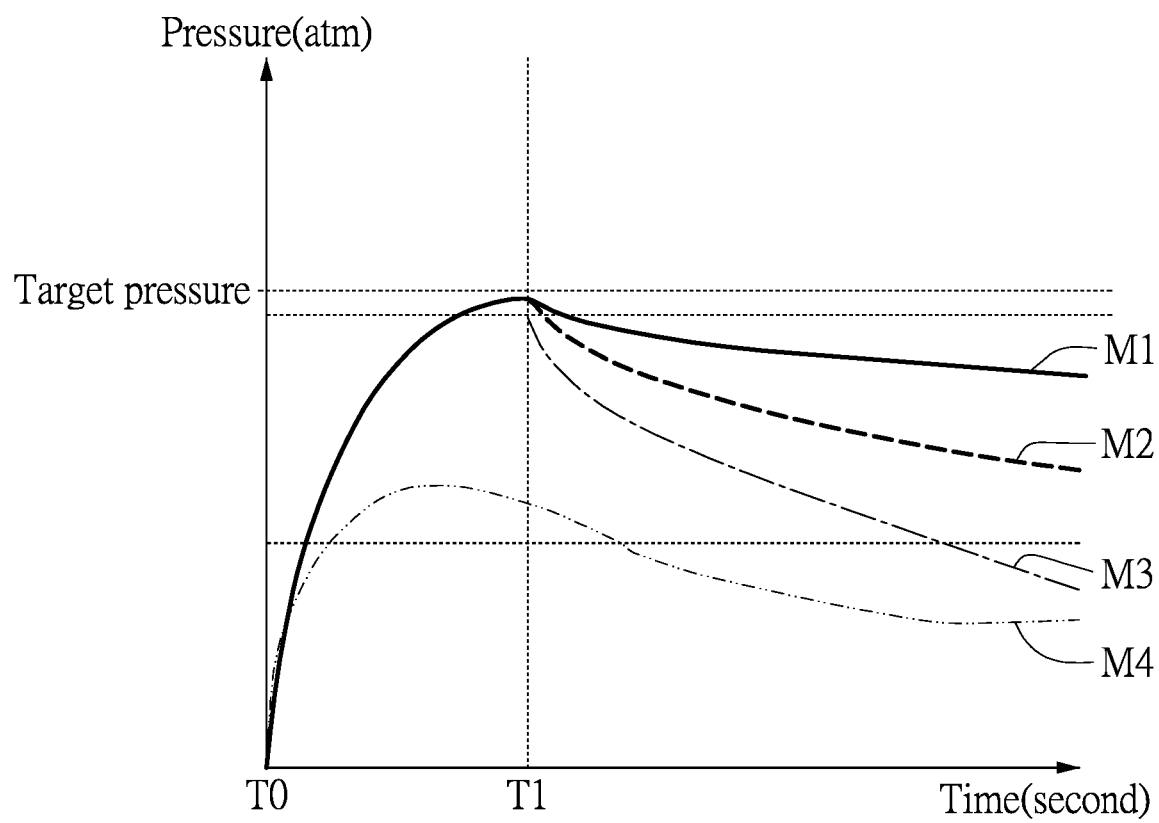
FIG. 6 is a schematic view showing a relationship between a gas pressure in a sound hole and time.

FIG. 6 is a schematic view showing a relationship between a gas pressure in a sound hole and time. As shown in FIG. 6, the sound holes of four different microphones M1 to M4 are inflated within pressure tolerance time. The pressure tolerance time is between a time point T0 and a time point T1. The gas pressure in the sound hole of each of the four different microphones M1 to M4 is detected at the same time. The gas pressures in the sound holes of the microphones M1 to M3 can reach the target pressure, but the gas pressure in the sound hole of the microphone M4 cannot reach the target pressure. The gas pressure in the sound hole of the microphone M4 has decreased before the time point T1, which indicates serious air leakage due to poor assembly of the microphone M4. Therefore, the microphone M4 is recorded as a defective product. After the time point T1, inflating the sound holes of the microphones M1 to M4 is stopped. After inflating the sound holes is stopped, the gas pressures in the sound holes of the microphones M1 to M3 gradually decrease with time, which indicates that the microphones M1 to M3 also have other gaps other than the sound holes. As a result, the gas pressures in the sound holes of the microphones M1 to M3 cannot be maintained at the target pressure. The gas pressure change rate in the sound hole of the microphone M1 is smaller than that of the microphone M2, and the gas pressure change rate in the sound hole of the microphone M2 is smaller than that of the microphone M3. Since the gas pressure change rate in the sound hole of the microphone M1 is the smallest, the sound isolation performance of the microphone M1 is the best.

Figure 7:
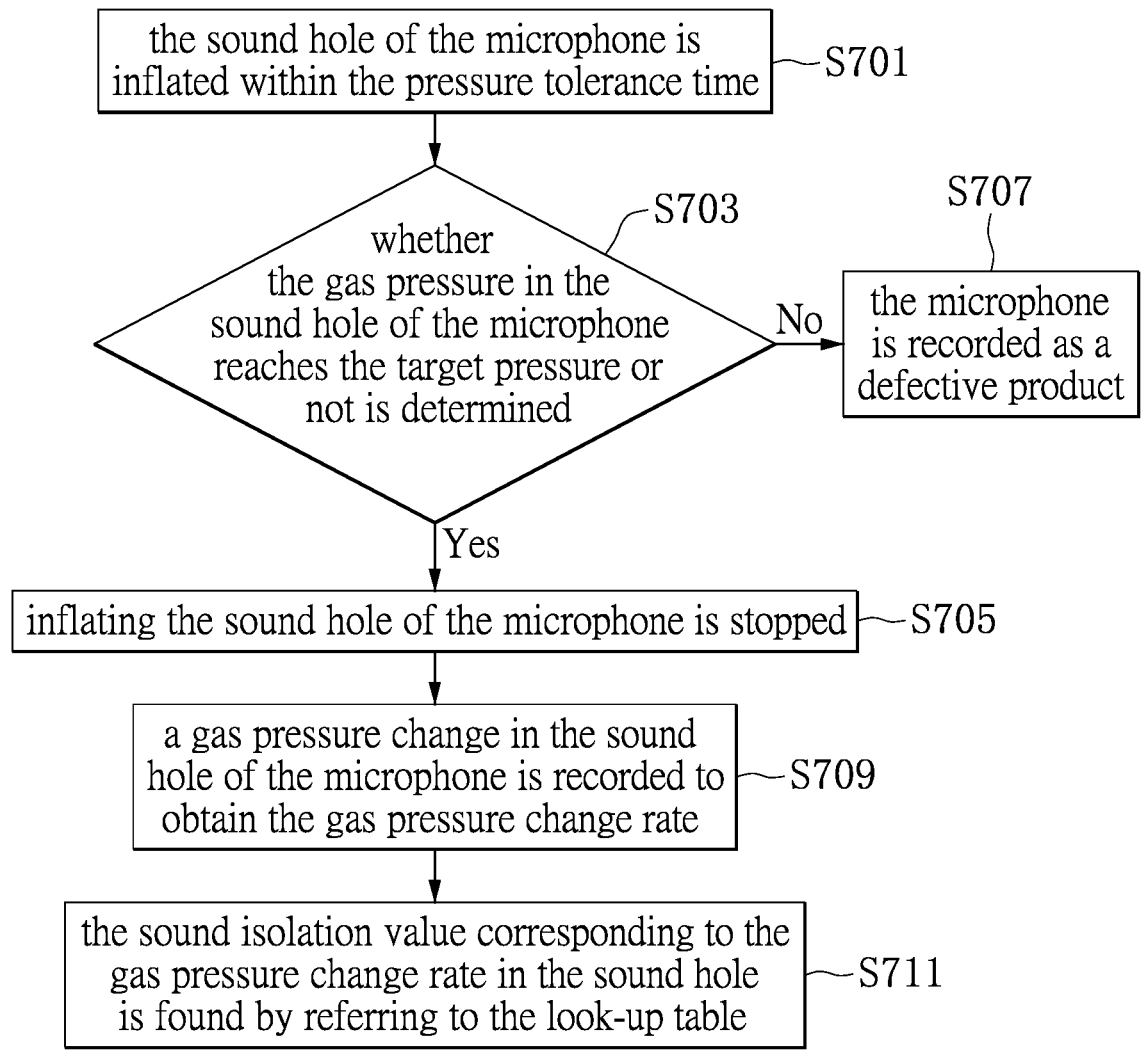
FIG. 7 is a flowchart of the sound isolation testing method according to the second embodiment of the present disclosure.

FIG. 7 is a flowchart of the sound isolation testing method according to the second embodiment of the present disclosure. The main difference between the sound isolation testing method of the second embodiment (FIG. 7) and the sound isolation testing method of the first embodiment (FIG. 5) is that the memory 135 of the gas pressure detector 13 in the second embodiment stores a look-up table. The look-up table records multiple gas pressure change rates and corresponding sound isolation value thereof. When the gas pressure detector 3 detects the gas pressure change rate in the sound hole 201 of the microphone 2, the sound isolation value of the microphone 2 can be found through the look-up table. Detailed steps illustrated in FIG. 7 are described below.

In step S701, the sound hole 201 of the microphone 2 is inflated within the pressure tolerance time. In other embodiments, the sound hole 201 of the microphone 2 can also be deflated instead of being inflated. In step S703, whether the gas pressure in the sound hole 201 of the microphone 2 reaches the target pressure or not is determined. When the gas pressure in the sound hole 201 of the microphone 2 has reached the target pressure, the step S703 is followed by step S705. In the step S705, inflating the sound hole 201 of the microphone 2 is stopped. When the gas pressure in the sound hole 201 of the microphone 2 has not reached the target pressure, the step S703 is followed by step S707. In the step S707, the microphone 2 is recorded as a defective product.

In step S709, after inflating the sound hole 201 of the microphone 2 is stopped, a gas pressure change in the sound hole 201 of the microphone 2 is recorded to obtain the gas pressure change rate. In step S711, the sound isolation value corresponding to the gas pressure change rate in the sound hole 201 is found by referring to the look-up table. The sound isolation testing method is ended after the step S711.

The sound isolation testing method of FIG. 7 can be performed by the sound isolation testing system of FIG. 2 or the sound isolation testing system of FIG. 4. Specifically, in the step S701, the controller 133 of the gas pressure detector 13 instructs the gas pressure generator 117 of the detection device 11 to inflate the sound hole 201 of the microphone 2. In the step S705, the controller 133 of the gas pressure detector 13 instructs the gas pressure generator 117 to stop inflating the sound hole 201 of the microphone 2. The steps S703, S709 and S711 are performed by the controller 133 of the gas pressure detector 13, and the step S707 is performed by the memory 135.

It should be noted that the sound isolation testing method of FIG. 7 can also be performed by other gas pressure testing systems, and is not limited to the sound isolation testing system of FIG. 2 or the sound isolation testing system of FIG. 4.

The sound isolation value may be obtained and varied with the target pressure, and therefore the sound isolation value may be in a range. For example, the target pressure can be set as 0.8 atmospheres when the sound hole is inflated. The target pressure can be set as 0.1 atmospheres when the sound hole is deflated. When the target pressure is set as 0.8 atmospheres, the range of the sound isolation value is between 10 decibels and 20 decibels, an upper limit threshold of the range of the sound isolation value is 20 decibels, and a lower limit threshold of the range of the sound isolation value is 10 decibels. When the target pressure is set as 1.2 atmospheres, the range of the sound isolation value is between 21 decibels and 30 decibels, the upper limit threshold of the range of the sound isolation value is 30 decibels, and the lower limit threshold of the range of the sound isolation value is 21 decibels. Therefore, when the sound isolation value is equal to the lower limit threshold, the sound isolation value of the microphone 2 may actually be lower than the lower limit threshold, so that the target pressure can be decreased to test the sound isolation of the microphone 2 again. Conversely, when the sound isolation value is equal to the upper limit threshold, the sound isolation value of the microphone 2 may actually be higher than the upper limit threshold, so that the target pressure can be increased to test the sound isolation of the microphone 2 again. Therefore, the sound isolation testing method of a third embodiment is provided below.

Figure 8:
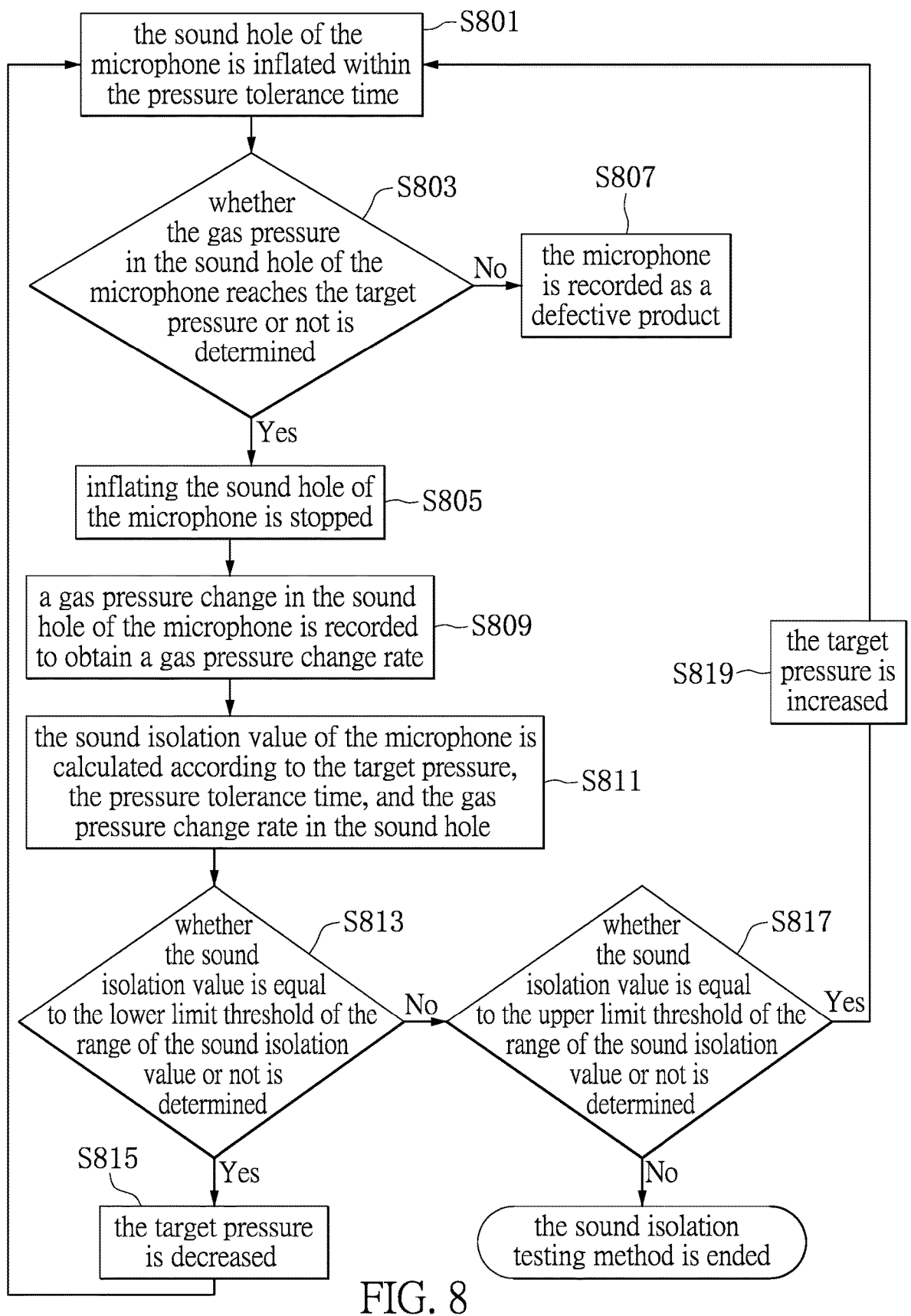
FIG. 8 is a flowchart of the sound isolation testing method according to a third embodiment of the present disclosure.

FIG. 8 is a flowchart of the sound isolation testing method according to a third embodiment of the present disclosure.

In step S801, the sound hole 201 of the microphone 2 is inflated within the pressure tolerance time. In other embodiments, the sound hole 201 of the microphone 2 can also be deflated instead of being inflated. In step S803, whether the gas pressure in the sound hole 201 of the microphone 2 reaches the target pressure or not is determined. When the gas pressure in the sound hole 201 has reached the target pressure, the step S803 is followed by step S805. In step S805, inflating the sound hole 201 of the microphone 2 is stopped. When the gas pressure in the sound hole 201 of the microphone 2 has not reached the target pressure, the step S805 is followed by step S807. In step S807, the microphone 2 is recorded as a defective product.

In step S809, after inflating the sound hole 201 of the microphone 2 is stopped, a gas pressure change in the sound hole 201 of the microphone 2 is recorded to obtain a gas pressure change rate.

In step S811, the sound isolation value of the microphone 2 is calculated according to the target pressure, the pressure tolerance time, and the gas pressure change rate in the sound hole 201. In step S813, whether the sound isolation value is equal to the lower limit threshold of the range of the sound isolation value or not is determined. When the sound isolation value is confirmed to be equal to the lower limit threshold, the step S813 is followed by step S815. In step S815, the target pressure is decreased. The sound isolation testing method returns to the step S801 after the step S815.

When the sound isolation value is confirmed not to be equal to the lower limit threshold, the step S813 is followed by step S817. In the step S817, whether the sound isolation value is equal to the upper limit threshold of the range of the sound isolation value or not is determined. When the sound isolation value is confirmed to be equal to the upper limit threshold, the step S817 is followed by step S819. In the step S819, the target pressure is increased. The sound isolation testing method returns to the step S801 after the step S819. When the sound isolation value is confirmed not to be equal to the upper limit threshold, the step S817 is followed by step S821. In the step S821, the sound isolation testing method is ended.

The sound isolation testing method of FIG. 8 can be performed by the sound isolation testing system of FIG. 2 or the sound isolation testing system of FIG. 4. Specifically, in the step S801, the controller 133 of the gas pressure detector 13 instructs the gas pressure generator 117 of the detection device 11 to inflate the sound hole 201 of the microphone 2. In the step S805, the controller 133 of the gas pressure detector 13 instructs the gas pressure generator 117 to stop inflating the sound hole 201 of the microphone 2. The steps S803, S809 and S811 to S819 are performed by the controller 133 of the gas pressure detector 13, and the step S807 is performed by the memory 135.

It should be noted that the sound isolation testing method of FIG. 8 can also be performed by other gas pressure testing systems, and is not limited to be the sound isolation testing system of FIG. 2 or the sound isolation testing system of FIG. 4.

In conclusion, in the sound isolation testing system and the sound isolation testing method provided by the present disclosure, a conventional sound isolation testing method which utilizes a sound source for measurement can be replaced, and the sound isolation value can be quickly obtained. Since environmental noise around the product can be ignored, and the product does not need to perform any action, the time required for testing the sound isolation can be significantly reduced. At the same time, the sound isolation of the microphone of the product can be obtained without setting up a large number of devices and meeting strict requirements on the surrounding environment in advance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sound isolation testing system, adapted to test a product having a sound hole, the sound isolation testing system comprising:
   a detection device comprising a gas cover, wherein the sound hole is sealed by the gas cover; and
   a gas pressure detector electrically connected to the detection device, wherein the gas pressure detector determines a gas pressure change rate in the sound hole, and calculates a sound isolation value of the product according to the gas pressure change rate, a target pressure, and a pressure tolerance time;
   wherein, $F=a*x+b*y+c*z+d$, in which F is the sound isolation value of the product, x is the target pressure, y is the pressure tolerance time, z is the gas pressure change rate in the sound hole, and a, b, c and d are correction parameters.

2. The sound isolation testing systems according to claim 1, wherein the detection device further includes a gas pipeline and a gas pressure generator, and two ends of the gas pipeline are respectively connected to the gas cover and the gas pressure generator.

3. The sound isolation testing system according to claim 2, wherein the detection device further includes a control valve, and the control valve is connected to the gas pipeline, when the sound hole is inflated or deflated by the gas pressure generator, the control valve is in an opened state, when the gas pressure generator stops inflating or deflating, the control valve is in a closed state.

4. The sound isolation testing system according to claim 2, wherein the gas pressure detector includes a detection circuit and a controller, the detection circuit is connected to the gas pipeline and adapted to detect a gas pressure in the sound hole, and the controller is electrically connected to the detection circuit and the gas pressure generator.

5. The sound isolation testing system according to claim 4, wherein the gas pressure detector further includes a display, the display is electrically connected to the controller, and a change of the gas pressure in the sound hole is displayed by the display.

6. The sound isolation testing system according to claim 4, wherein the gas pressure detector further includes a memory electrically connected to the controller, and a change of the gas pressure in the sound hole is stored by the memory.

7. A sound isolation testing method, adapted to test a product having a sound hole, the sound isolation testing method comprising:
   inflating or deflating the sound hole within a pressure tolerance time;
   stopping the inflation or the deflation of the sound hole when a gas pressure of the sound hole reaches a target pressure;
   recording a change of the gas pressure in the sound hole, so as to calculate a gas pressure change rate; and
   calculating a sound isolation value of the product according the gas pressure change rate, the target pressure and the pressure tolerance time;
   wherein, $F=a*x+b*y+c*z+d$, in which F is the sound isolation value of the product, x is the target pressure, y is the pressure tolerance time, z is the gas pressure change rate in the sound hole, and a, b, c and d are correction parameters.

8. The sound isolation testing method according to claim 7, further comprising:
   increasing the target pressure to test the sound isolation value of the product again when the sound isolation value of the product is equal to an upper limit threshold of an range of the sound isolation value, and decreasing the target pressure to test the sound isolation value of the product again when the sound isolation value of the tested product is equal to a lower limit threshold of the range of the sound isolation value.

9. The sound isolation testing method according to claim 7, wherein, when the gas pressure in the sound hole is unable to reach the target pressure, the product is recorded as a defective product.

* * * * *